Figure 1:
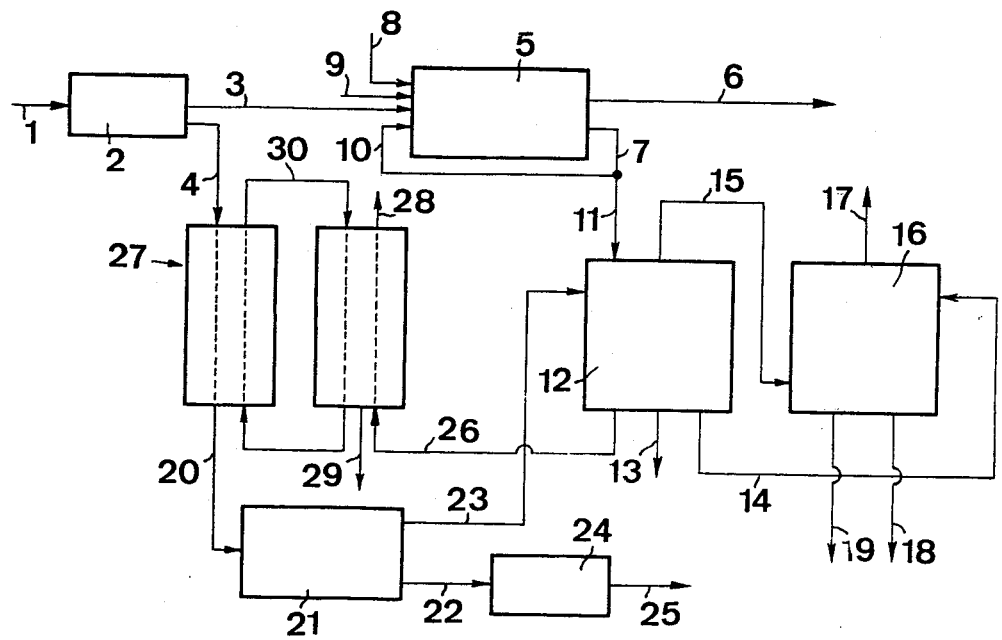

United States Patent [19]

de Mathan

[11] 4,070,351

[45] Jan. 24, 1978

[54] PROCESS FOR THE TREATMENT OF VEGETABLE MATTER WITH RECOVERY OF CALORIES FROM THE DEHYDRATION STACK GASES AND APPLICATIONS THEREOF

[75] Inventor: Olivier de Mathan, Olivet, France

[73] Assignee: France-Luzerne, Paris, France

[21] Appl. No.: 658,332

[22] Filed: Feb. 17, 1976

[51] Int. Cl.$^2$ .......................... A23J 1/14; C07G 7/00
[52] U.S. Cl. ............................. 260/112 R; 159/17 R
[58] Field of Search .................. 260/112 R; 159/17 R

[56] References Cited

U.S. PATENT DOCUMENTS 3,823,128  7/1974  Bickoff et al. .................. 260/112 R

OTHER PUBLICATIONS

King, *Separation Processes*, McGraw-Hill Book Company, N.Y., pp. 680-683, 761-768 (1971).
Perry, *Chemical Engineer's Handbook*, McGraw-Hill Book Company, N.Y. (1969), pp. 11-37, 38.

*Primary Examiner*—Harold D. Anderson
*Assistant Examiner*—W. C. Danison, Jr.
*Attorney, Agent, or Firm*—Hammond & Littell

[57] ABSTRACT

A treatment of vegetable matter such as alfalfa with recovery of the calories from the dehydration stack gases is described.

The calories in the moist dehydration stack gases are recovered essentially by condensation of the steam contained therein, notably in the first evaporation body for the concentration of the dehydration serum.

The process provides a considerable saving of thermal energy in integrated process for dehydrating alfalfa and recovering proteins contained therein.

8 Claims, 2 Drawing Figures

PROCESS FOR THE TREATMENT OF VEGETABLE MATTER WITH RECOVERY OF CALORIES FROM THE DEHYDRATION STACK GASES AND APPLICATIONS THEREOF

The present invention relates to the field of the treatment of vegetable matter, such as lucerne (also called alfalfa) to covert it into a dehydrated concentrate, and/or to extract the proteins contained therein.

It is well known to subject raw vegetable matter, such as alfalfa, to a dehydration treatment in which the matter, before or after pressing, is introduced into a zone heated to high temperature by heating means. These are generally burners burning a gas or liquid fuel, such as fuel oil. Dehydration is an operation requiring a great deal of energy, and it is therefore very desirable to decrease energy requirements, especially as the subsequent treatments of the dehydrated matter and/or the liquors or sera obtained consume more calories.

The object of the invention is a process making it possible to economize energy by making use of the calories available in the stock gases formed when vegetable matter is dehydrated.

Generally speaking, the invention relates to an improvement to a process for treating vegetable matter, such as alfalfa, in which the raw material is subjected to pressing providing a liquor and a cake, the cake is dehydrated by being passed through a zone heated to a high temperature by heating means and a dehydrated cake is recovered, said improvement consisting in that the calories available in the stack gases from the dehydration zone are recovered, said stack gases being at a temperature between about 100° C and about 120° C at atmospheric pressure and having a high steam content, in passing the stack gases over at least one exchange surface in order to at least partially condense the steam contained therein, the condensed water being withdrawn or recovered, and in that the calories obtained from the stack gases during condensation of steam are used in the consecutive of the cake and/or pressing liquor which, in a known manner, require a supply of external heat.

The stack gases produced during dehydration contain large amounts of steam which are usually discharged into the atmosphere. Frequently, in the burners used for heating the dehydration zone, an excess of air with respect to fuel is used and a portion of the stack gas is recycled in the burner in the form of hot gases. The temperature in the dehydration zone may be as high as 1200° C, but lower values of up to 800° C, and even lower, will be obtained in the case of partial stack gas recycling, as a main skilled in the art knows that it is desirable to limit dehydration temperature to avoid damaging the vegetable matter.

Contrary to the ideas at present prevalent, the invention makes use of the calories available in the dehydration stack gases, and essentially by means of the condensation of the steam contained therein.

It should also be noted that the process of the invention combines the recovery of stack gases with the preliminary step of pressing the raw material.

The stack gases which can be used according to the invention, for the recovery of calories by cooling and condensation of a portion of the steam, has the following characteristics:

| Temperature | 100 to 120° C |
|---|---|
| Mean composition by weight : | |
| $CO_2$ | 7.5 to 9.5 % |
| Steam | 35 to 45 % |
| Nitrogen | 40 to 50 % |
| Oxygen | 2.5 to 7.5 % |

Said stack gases are practically at atmospheric temperature. The amounts available depend on the initial moisture content and the extent to which the fodder is compressed.

As an example, with a fodder containing 20% dry matter, reduced by pressing to 27% dry matter by the elimination of liquor containing 10.5% dry matter, the weight of stack gases available will be approximately 1 ton per ton of fresh product or 5 to 7 tons per ton of pressed fodder pellets. When the characteristics of the stack gases are examined, the conditions of recovery are found to be not entirely favourable; the temperature level is low, and all the lower the larger the fraction of calories to be recovered by steam condensation.

Air, water or another, preferably aqueous liquid, may be used as the stack gas exchange fluid. However, in practice, air is not suitable as a calory vector as its use would necessitate very large exchange surfaces. Furthermore, only a fraction of the air heated by the stack gas could be used as combustion and dilution air in the dryer. The preferred exchange fluid is water.

When stack gases are cooled to a certain temperature, their maximal steam content is defined by the pressure of saturating steam at this temperature and the excess is of necessity condensed.

Therefore, the higher the absolute humidity content of the stack gas before cooling, the higher is the proportion of stack gas condensed, hence the utility of conducting combustion with the minimum of excess air, but also the necessity of effecting stack gas recycling to limit the temperature in the first dehydration stage.

Lowering the stack gases temperature therefore generates calories, possibly in very large amounts, the major portion of which are obtained from the latent heat by condensation and the remainder are obtained from the cooling proper of the gases.

For example, in the case of a combustion controlled at 25% excess air, recovery of the calory content of the stack gas is higher than 90% if cooling attains 60° C.

The invention provides for the use of calories recovered from the dehydration stack gases, during subsequent treatments of the dehydration products and other products associated with the present day processes using vegetable matter, and notably alfalfa. To be sure, it is possible to imagine using the calories in a traditional manner, for example for the requirements of urban and domestic heating. This use does not appear to be of any interest, as green plants such as alfalfa are harvested in summer and heating requirements are obviously very limited, and even non-existent, at this period. Another object of this invention is also an integrated process for the treatment of vegetable matter such as alfalfa.

According to an advantageous embodiment, recovery of calories from dehydration stack gases is effected during the evaporation treatment of serum, if the liquid substance is obtained from the pressing liquor. Evaporation is realized in the conventional manner to concentrate the serum, notably in a multiple stage systematic operation with or without thermocompression where the serum circulates globally in counter-flow to the hot fluid (generally steam). According to the invention, the dehydration stack gas is used, at least partially, as the hot fluid in the first stage of the evaporator provided to concentrate the serum, and the acid condensates obtained from cooling the moist stack gas are collected or removed.

The stack gases obtained during dehydration and having passed through the first serum concentration stage can be discharged into the atmosphere or, as a variant, be used to preheat the pressing liquor. In this case, the acid condensates are also collected or removed, while the stack gases, after having heated the pressing liquor, are discharged into the open air.

According to the invention, acid condensate can advantageously be used as a starting product in other steps or the treatment process. Indeed, the sulphur dioxide present in the stack gases is converted into sulphur trioxide and then into sulphuric acid in the aqueous condensation medium.

According to one example of utilization, the acid condensates can be added to the serum, which is, for example, at a pH of approximately 6, to change the pH to about 5 as is necessary for certain treatments, and notably in alfalfa processing.

According to another example of utilization, in the case of a treatment including soaking vegetable matter in an alkaline medium, with or without heating, the brown liquor containing proteins in solution has a neutral or basic pH, in which case the acid condensate can be added to the brown liquor, said acidification contributing to the recovery of the proteins in the liquor.

The invention is obviously not limited to these examples. It covers all integrated processes using acid condensates in any step wherein an acid treatment is used.

The invention is therefore seen to provide an integrated process for the treatment of vegetable matter, such as alfalfa, including both the recovery of calories and that of the potential acidity of the dehydration stack gases.

Examples of application of the process of the invention will now be given for illustration purpose only.

EXAMPLE 1

This example relates to the treatment of vegetable matter, and particularly green plants such as alfalfa of the type described notably in the U.S. Pat. No. 3,823,128 incorporated herein by way of reference.

It should be remembered that, in this process, the fodder is first subjected to pressing to provide a cake and a green liquor. The cake is dehydrated, and the green liquor is subjected to a chemical treatment, after which a serum and a cream (or coagulum) are separated out. The serum is concentrated and the cream dried. A man of the art knows that this type of process comprises at least 4 thermal consumption points, i.e.
dehydration of the cake
heating the liquor
drying the cream
concentration of the serum As an example, in the case of alfalfa having an average moisture content and subjected to coventional pressing, said consumptions represent the following values in percentage compared with the dehydration of the unpressed product:

| | |
|---|---|
| complete dehydration without recycling | 100 % |
| complete dehydration with recycling | 93 % |
| dehydration of cake without recycling | 50 % |

-continued

| | |
|---|---|
| dehydration of cake with recycling | 47 % |
| liquor heating | 8 % |
| cream drying | 7 % |
| serum concentration | 11 % |

In the integrated process of the invention with recovery of the calories contained in the dehydration stack gases, all the calories necessary for the concentration of serum can be supplied at the first stage of the evaporator or first evaporation body. According to a further embodiment, the dehydration stack gases can also be used as a source of heat to preheat the liquor in a process in which the products run in a closed diagram.

This last mode of embodiment is illustrated in FIG. 1. As is seen in the drawing, the fresh fodder is introduced at 1 into a pressing apparatus 2, which provides a cake at 3 and a liquor at 4; the cake is then subjected to dehydration at 5 providing a dried cake at 6 and, at 7, stack gases which will be used according to the invention, as will be described hereinafter. The reference 8 is a diagrammatic representation of the air input to the dryer and 9 and the input of combustion gases from a fuel burner. As is known, a portion of the stack gas is recycled at 10 to the dehydration step.

According to the invention, the remainder of stack gases 11 is introduced into the first body 12 of the serum evaporation apparatus. The acid condensates resulting from the condensation of the steam contained in the stack gas are collected or removed at 13. The preconcentrated serum is flowed through line 14 to be introduced into the consecutive bodies of the evaporator 16 where it circulates in a counterflow with respect to the stack gas which is, moreover, introduced at 15. After evaporation, the residual stack gas is discharged into the atmosphere at 17, while the concentrated serum is collected at 18 and the condensates are collected or removed at 19.

The pressuring liquor 4 is first preheated, as will be described hereinafter, before being introduced at 20 into a zone 21 where it is subjected in a known manner to chemical and/or thermal treatments, and separation step, providing, on the one hand, a cream 22 and, on the other, a serum 23. It is the serum 23 which is passed into first body of evaporator 12. The cream is dried in 24 and a protein concentrate is obtained at 25.

According to the invention, the stack gases 11, after having passed through the first body of evaporator 12, are dispatched at 26 into an exchange circuit represented by the general reference number 27. After having released their residual heat, the stack gases are discharged into the atmosphere at 28. The acid condensates are collected or removed at 29. Reference 30 represents a closed circuit for water another thermal fluid which, after having absorbed calories by heat exchange wih the stack gas introduced at 26, releases calories to the liquor 4 to provide a preheated liquor 20.

The invention has been illustrated in the previous example which describes the use of stack gases, first in the first serum evaporation body and, then, for heating the liquor. It is understood that the invention also covers the case where the stack gases are only used for one or the other of said steps.

Referring to the preceeding consumption figures, the use of the process of the invention provides a considerable saving of fuel, as will be seen from the following table giving thermal consumptions:

| | |
|---|---|
| complete dehyration without recycling | 10 % |
| complete dehydration with recycling | 93 % |
| Pressing + dehydration without recycling | 76 % |
| Pressing + dehydration with recycling | 33 % |
| Pressing + dehyration with recycling + stack gases for concentration and preheating liquor (process of the invention) | 59 % |

Of course, the ratio of amount of heat recoverable and the amount to be supplied to various points in the process varies with the initial moisture and the pressing rate. An addition of calories remains necessary in all cases and in proportions which vary with the conditions mentioned.

EXAMPLE 2

The invention can also be embodied in the form of an integrated process using the process described in French Pat. No. 72,18,707 also incorporated herein by way of reference. In this case, the process will be put into effect in the same manner as in example 1. The essential difference lies in the treatment of the liquor which, in the case of the process of French Pat. No. 72,18,707 is decomposed in two successive precipitation-separation steps. In this case, the production of concentrate is divided in two, in order to obtain, on the one hand, a chloroplastic fraction in which essentially the pigments are present and, on the other, a cytoplasmic fraction. In its application to such a process, it is possible, according to the invention, to advantageously provide for using the calories available in the moist dehydration stack gases, for concentration of the serum and, in addition and if necessary, for heating the green liquor.

EXAMPLE 3

The invention can also be applied in the form of an integrated process using a process of the type described, for example, in French Pat. No. 74,36,628 also incorporated herein by way of reference.

Figure 2:
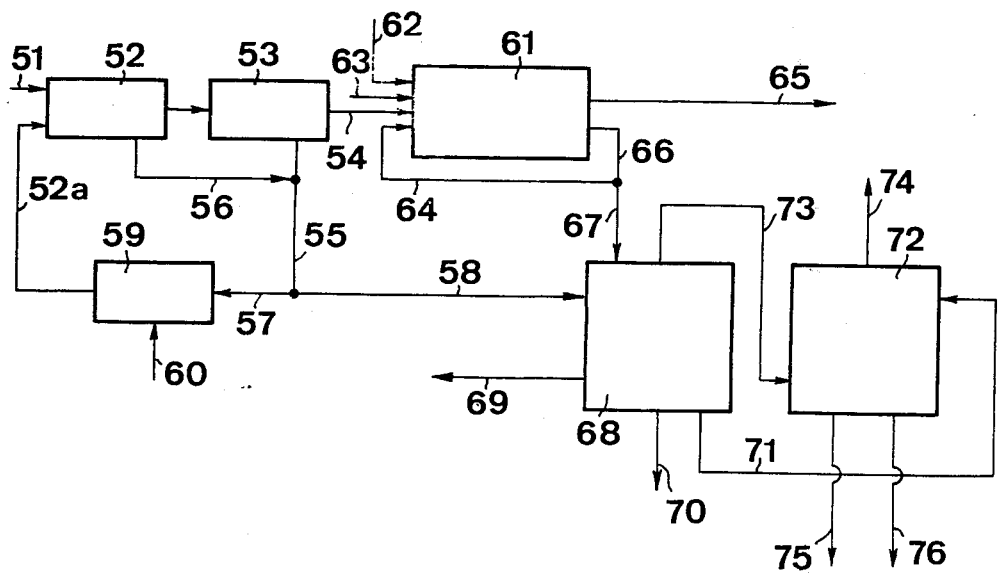

In such a process, the raw fodder is first soaked in a pressing serum recycled and reheated to a temperature sufficient to precipitate and maintain in the vegetable tissues the largest possible amount of proteins. After pressing, the cake is dehydrated, whereas the serum is partly reheated to be recyled to the preliminary soaking step, whilst the remainder of the serum is concentrated in the usual manner. This type of process will be illustrated in greater detail hereinafter with reference to FIG. 2. It comprises essentially three thermal consumption steps:
 dehydration of the cake
 heating the recycled steam
 concentration of the serum by evaporation As an example, if the matter treated is a normally pressed alfalfa of moderate moisture content, said consumptions represent, by percentage, the following values based on the dehydration of the upressed product:

| | |
|---|---|
| complete dehydration without recycling | 100 % |
| complete dehydration with recycling | 83 % |
| dehydration of the hot cake without recycling | 32 % |
| dehydration of the hot cake with recycling | 29 % |
| heating the recycled serum | 24 % |
| serum concentration | 14 % |

According to the invention, the moist dehydration stack gases can advantageously be used to provide all the calories necessary in the first evaporator body provided for concentration of the serum with or without thermocompression. Referring to the drawing (FIG. 2), the fresh fodder 51 is first subjected to a preliminary soaking 52 with recycled and reheated pressing serum introduced at 52a. After soaking, the moist fodder is subjected to traditional pressing 53, providing a cake at 54 and serum at 55. The soaking liquid can be added to serum 55 through pipe 56. Serum 55 is then divided into two portions, one portion 57 for recycling and one portion 58 for concentration. Serum 57 flows into an exchanger 59 in which it is rehated by the steam 60. At the outlet of exchanger 59 the serum 52a defined hereinabove is obtained, which is used in soaking 52. Cake 54 is subjected to a dehydration 61. This involves the introduction of air 62, hot gas 63, obtained from the combustion of a fuel oil burner and a certain amount 64 of recycled stack gases. After dehydration 61 a dried cake is obtained at 65 and the moist dehydration stack gas at 66. This is partly recycled to dehydration at 64, while the remainder 67 is introduced into the first evaporation body 68 provided for concentration with or without thermocompression of the serum 58. After having yielded up its calories, the stack gas leaves the evaporator body 68 and is discharged into the atmosphere at 69. The acid condensates are collected or discharged at 70. As is known for a multiple stage serum concentration, the preconcentrated serum obtained from the first body 68 is introduced at 71 into the following stages 72, where it circulates in a counterflow to stack gas 73. In the following stages, the stack gas is discharged into the atmosphere at 74 while the condensates are recovered or discharged at 75. The concentrated serum is recovered at 76.

Taking the above values for thermal consumption, and taking 100, complete dehydration, as a reference, the following values will be obtained:

| | |
|---|---|
| complete dehydration without recycling | 100 % |
| complete dehydration with recycling | 93 % |
| soaking + pressing + dehydration without recycling | 70 % |
| soaking + pressing + dehydration with recycling | 67 % |
| soaking + pressing + dehydration with recycling 30 recovery of heat in the stack gas for concentration (according to the invention) | 53 % |

EXAMPLE 4

The invention can also be used in the form of the integrated process in the process described in French Pat. No. 74,36,627 filed on the 4th Nov. 1974 and incorporated herein by way of reference. It will be simply recalled that, in this process, a chemical and/or thermal treatment is realized during this preliminary soaking of the raw vegetable material as a result of which the liquor extracted still contains the largest possible amount of proteins in solution, without pigments. The cake is subsequently dehydrated and the serum is concentrated. Recovery of the calories from moist stack gases and dehydration may again be used in this case for concentration of the serum, in the first evaporator body (with or without thermocompression). Furthermore, when thermal treatment during soaking is effected at a moderate temperature, for example, of 50° C or less, it is possible, according to the invention, to preheat the recycled serum by again recovering the calories in the already partially cooled stack gas in the first evaporator body provided for serum concentration. Said additional use of calories further improves the thermal efficiency.

The invention has been illustrated, while in no way being limited, in the preceeding examples. These are in no way limiting as the invention can be applied in a very general fashion, as long as the calories available in the moist dehydration stack gases are used. In fact, all the thermal stages of the processes for the treatment of fodder, such as alfalfa, can be carried out, completely or partially, by the process of the invention, with the exception, however, of the dehydration of cake which requires a large calory input.

I claim:

1. A process of the treatment of vegetable matter comprising:
   a. pressing the vegetable matter to provide a pressing juice and a cake,
   b. dehydrating said cake by passing it into a heated dehydration zone to provide a dehydrated cake and stack gases from the heated dehydration zone.
   c. recycling of a fraction of said stack gases at the input to said heated dehydration zone, said recycling being provided to obtain at the outlet of said heated dehydration zone stack gases having a temperature between about 100 to 120° C and containing $CO_2$, steam, nitrogen, and oxygen, the pressure being substantially equal to atmospheric pressure, and
   d. concentrating said pressing juice by passing it through a multiple effect evaporator, with the introduction of unrecycled stack gases into the first effect of said evaporator, whereby the steam contained in said unrecycled stack gases is at least partially condensed to provide a condensate and the non-condensable gases are discharged into the atmosphere.

2. The process of claim 1 wherein, prior to said concentration step (d), the pressing juice is first subjected to a protein extraction treatment which produces a serum and a protein fraction and the said serum is introduced into the multiple effect evaporator to be concentrated.

3. The process of claim 2, wherein the stack gases provided by dehydration, after having passed into the first serum concentration effect, are used to pre-heat the pressing juice, and after having yielded their heat to the pressing juice, are discharged into the atmosphere.

4. The process of claim 2 wherein, before pressing step (a), the vegetable matter is soaked by being mixed with a recycled portion of the pressing juice, and the stack gases obtained from dehydration, after having passed into the first serum concentration effect, are used to pre-heat the pressing juice which is recycled for said soaking.

5. The process of claim 1, wherein the condensate is added to the juice, the pH of the latter then changing from 6 to about 5.

6. The process of claim 4, wherein, during soaking, the pH of the mixture is adjusted to an alkaline value to provide, after pressing, a brown juice with a neutral or basic pH, and the condensate is added to the said brown juice in order to recover the proteins contained therein.

7. The process of claim 1, wherein the vegetable matter is alfalfa.

8. The process of claim 1, wherein the stack gases at the outlet of said heated dehydration zone have substantially the following average weight composition:

| | |
|---|---|
| $CO_2$, | 7.5 to 9.5% |
| steam, | 35 to 45 % |
| nitrogen, and | 40 to 50 % |
| oxygen | 2.5 to 7.5% |

* * * * *

UNITED STATES PATENT OFFICE
CERTIFICATE OF CORRECTION

Patent No. 4,070,351　　　　　　　　Dated　Jan. 24, 1978

Inventor(s)　olivier de mathan

It is certified that error appears in the above-identified patent and that said Letters Patent are hereby corrected as shown below:

[30] Left Out Priority Data

--February 25, 1975　　France　　75.05831--.

Signed and Sealed this

Fifteenth Day of August 1978

[SEAL]

Attest:

RUTH C. MASON
*Attesting Officer*

DONALD W. BANNER
*Commissioner of Patents and Trademarks*